United States Patent Office 3,285,534
Patented Nov. 15, 1966

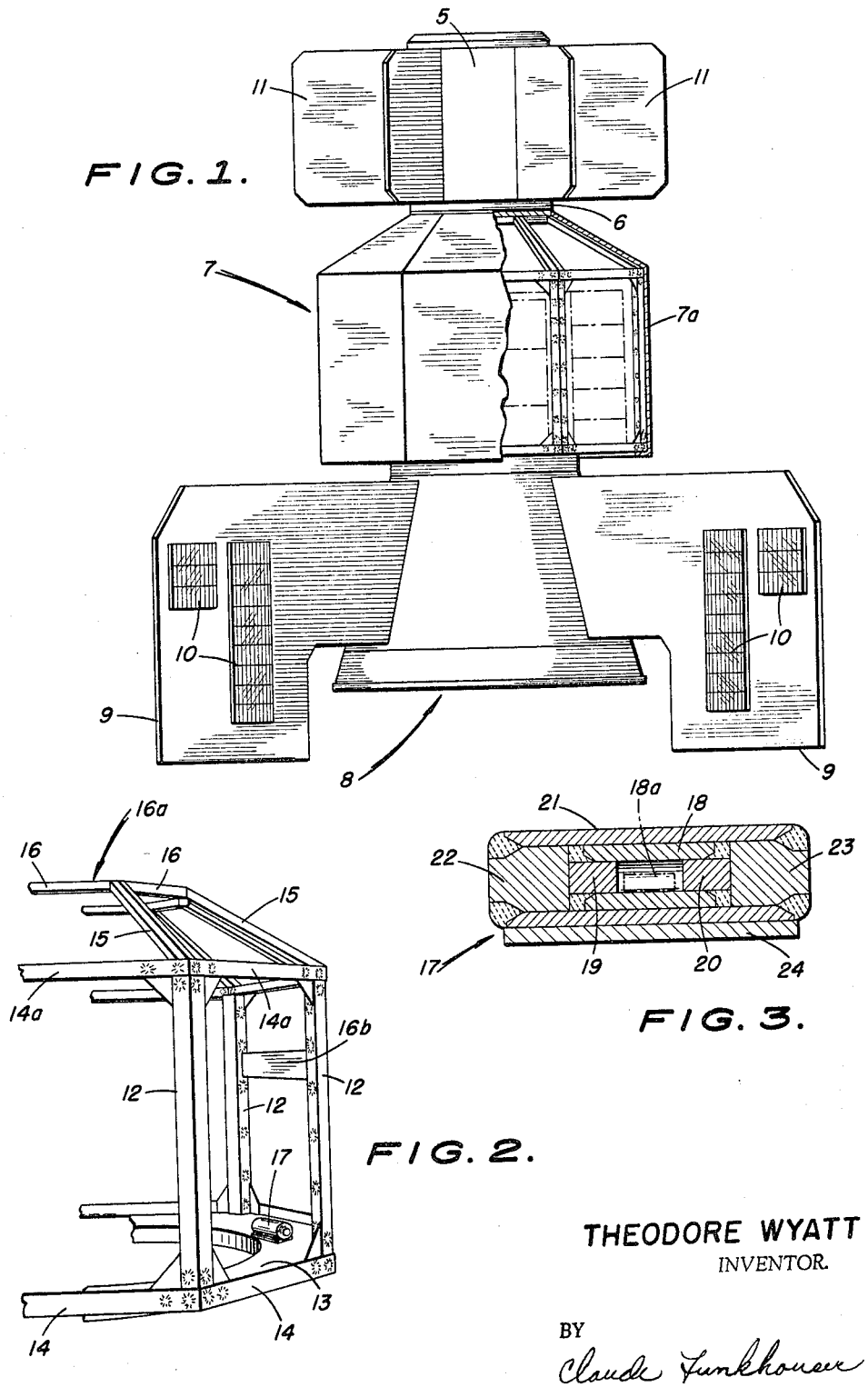

3,285,534
SATELLITE HEATING BY ATOMIC ENERGY
Theodore Wyatt, Silver Spring, Md., assignor to the United States of America as represented by the Secretary of the Navy
Filed Aug. 14, 1964, Ser. No. 390,279
2 Claims. (Cl. 244—1)

The present invention relates generally to space vehicles. More particularly, it relates to an improved temperature stabilized satellite.

The importance of temperature control in space satellites, so as to maintain the components therein within proper operating limits, is well-known. As the emphasis in satellite usage has shifted to the economical maintenance of operational systems, attention has been directed to the factors influencing satellite life in orbit. It is believed that one cause of satellite equipment failure is mechanical fatigue failure as a result of stress changes due to temperature changes, even though component limits are not exceeded.

One object of the present invention, therefore, is to provide a temperature stabilized satellite which is so designed that uniform heating of components therein will be effected and damage to such components from thermal stresses eliminated.

Another object of the invention resides in the provision of a temperature stabilized satellite which, in one embodiment, utilizes waste heat generated by the satellite power supply for maintaining constant temperature within the satellite.

As a further object the invention provides a space satellite which, in a modified embodiment, utilizes one or more capsules as a source of heat for maintaining the interior of the satellite at optimum temperature for proper component performance.

And a further object of the invention is to provide a satellite structure wherein most of the thermal insulation commonly employed may be eliminated, thus saving weight and simplifying design.

Other objects and many of the attendant advantages of this invention will be readily appreciated as the same becomes better understood by reference to the following detailed description when considered in connection with the accompanying drawings, wherein:

FIG. 1 is a side elevation partly broken away to show the interior of the improved satellite;

FIG. 2 is a detail perspective showing the instrument section of the interior of the improved satellite; and FIG. 3 is an enlarged detail section showing one of the radio-isotope heating capsules employed in a modified embodiment of the invention.

The equilibrium temperature of an earth satellite is established by the balance between the heat inputs to the satellite (solar radiation, earth radiation, internal electrical losses, etc.) and the heat output (infra-red radiation).

It has been demonstrated that two of the variable available to the satellite designer which are dominant influences on the temperature of a satellite are the values of the absorptivity, $\alpha$, and of the emissivity, $\epsilon$. In the composite design of a satellite these two variables are often the only ones which the thermal designer is free to specify.

However, it is also apparent that an inverse relationship exists between the sensitivity of the satellite temperature to the variable aspects of the environment and of the design and to the magnitude of the internal sources of heat. Thus, as the internal heat is increased as a fixed term the temperature of the satellite varies over a lesser range as the satellite alternately is exposed to solar illumination and is shaded from such illumination by the earth. Similarly, if the internal heat consists of a fixed and a variable portion (such as internal electrical loads or dissipations which are occasionally off or on), then the constancy of the satellite temperature depends upon the relative size of the fixed and variable portions of the internal heat.

The effect of the intermittent electric heating sometimes employed in satellites can be seen to amount to a vernier variation of the internal heat, controlled in a fashion tending to keep the temperature constant, as an assist to the general technique of a high degree of thermal isolation employed in several current satellite programs. In the present invention the internal heat is increased by a relatively large, constant increment through the provision of heat generated by the decay of a radio-active isotope, and the thermal emission of the satellite, rather than thermal isolation, is the basic design approach. This approach will make the range of the temperature excursions less under varying conditions of solar illumination or internal electrical load for two reasons. One is the above-mentioned reason that the increase in internal heat by a substantial, fixed amount makes the variable input a smaller modulation of the over-all thermal balance. The other reason is that, in compensating for increased internal heat, so as to maintain the temperature at the desired level, the emissivity, $\epsilon$, must be increased compared to that otherwise employed. Since the absorptivity need be changed only slightly, a reduction in $\alpha/\epsilon$ results. The $\alpha/\epsilon$ is a measure of the coupling between the satellite and the space environment. Thus, in reducing $\alpha/\epsilon$, an additional reduction occurs in the response of the satellite's thermal balance to the variable aspects of the environment, such as the presence or absence of solar radiation.

Heretofore, the waste heat produced as a consequence of the rather low efficiency of the radio isotope thermoelectric conversion process has been regarded as a necessary evil. The present invention contemplates a structure in which the thermoelectric generator is connected, through a shim of such area and conductivity as to permit the flow of a desired amount of heat, to the metallic frame of the instrument section of the satellite. All of the frame members are welded or similarly connected so as to be in heat conductive relation. In the modified embodiment of the invention uniformity of heat distribution throughout the instrument section may be controlled by the utilization of heat producing capsules positioned on the frame.

Referring to FIG. 1, the improved satellite is seen to consist of a thermoelectric generator 5 thermally connected through a shim 6 to the instrument section 7. As stated hereinabove, the shim 6 is of such area, and has such conductivity characteristics, that it will permit the conduction of a predetermined amount of heat from the generator 5 to the instrument section. Depending from the instrument section 7 is a tail or steering section 8 having a plurality of fins 9 and solar cells 10. A plurality of radiating fins 11 extend radially outwardly from the generator 5, transferring from the satellite most of the waste heat generated as a consequence of the low efficiency of the thermoelectric process. For optimum operation of the components, it has been empirically determined that the fins 11 should radiate most of the heat produced by the generator 5. In order to insure that too much heat is not transferred through the shim 6 to the frame of the instrument section, said shim may be made of a poor thermal conductivity material, such as Fiberglas or asbestos, or of a metal foil having a small area.

The frame of the instrument section 7, as seen in FIG. 2, is formed of a plurality of annularly spaced, upstanding metallic posts 12, extending from a base plate 13. The posts 12 may have their lower ends attached to the plate in any manner which effects good thermal conduction, such as by welding. The structural rigidity of the instrument section frame may be enhanced by welding metallic strips 14 to the outer periphery of the plate 13 and attaching the posts to these strips. The upper end of the frame of the instrument section may be constructed identically with the lower end and may be formed by attaching the upper ends of the posts 12 to strips 14a. If desired, the upper end can be provided with a plate similar to plate 13. Attached to the upper strips 14a are a plurality of angularly oriented posts 15. The upper ends of posts 15 are affixed to metallic strips 16, all located in a plane parallel to the plate 13 and defining a top ring 16a of lesser diameter than the plate. The frame may be made more rigid, if deemed necessary or desirable, by the use of metallic stiffeners or plates connected between the posts 12. One of said stiffeners is illustrated at 16b and may be of any suitable design, and should be affixed in thermally conductive relation to the posts 12. The stiffeners also serve as radiation shields, protecting the instruments carried interiorly of the frame.

Because of the heat conducting relationship between the various frame parts, a portion of the waste heat of the thermoelectric generator will be distributed therethrough. The temperature will be stabilized within the instrument section from the waste heat of the thermoelecrtic generator despite fluctuations from internal electrical loads, variations of sunlight, and other transient heat sources. The heat distribution can be made uniform by a judicious arrangement of components, i.e., the electronic packages which dissipate the most waste heat should be placed most remotely from the thermoelectric generator.

A typical satellite has internal waste heat amounting to about 20 watts. As an example, results obtainable by increasing this internal heat to 70 watts will now be discussed. Since discoloration of satellite paints in orbit and the resulting increase in absorptivity is a problem, particularly acute in the case of those paints having an initially low value of absorptivity, it is useful to examine the results in the context of paint stability. It has been determined that a reasonable design choice for a 20 watt satellite might be $\epsilon=0.4$ and $\alpha/\epsilon=0.8$ and for a 70 watt satellite $\epsilon=0.8$ and $\alpha/\epsilon=0.6$. These values would result in a maximum satellite temperature of 92° F. The 70 watt satellite would then exhibit about three-quarters of the temperature variation of the 20 watt satellite (18° vs. 24° F.) as the sunlit portion of the orbit varied from 100% to 70%. This, of course, would ont be a substantial improvement. However, in terms of coping with a paint discoloration problem a real benefit is provided. A modest increase from $\alpha=0.32$ to $\alpha=0.40$ would cause the 20 watt satellite to rise to 115° F., whereas the 70 watt satellite would have to go from $\alpha=0.48$ to $\alpha=0.64$ to rise to 114° F. Thus, the satellite having the greater internal heat is one-half as sensitive to changes in absorptivity. More important is the fact that the more highly heated satellite can employ an initial absorptivity which is 50% greater and thus inherently much less subject to an increase in absorptivity in the space environment. Alternatively, if one had confidence in the stability of the absorptivity of the paint, a 70 watt satellite could be given a finish affording a 70%–100% sunlight temperature change of about 6° F., whereas the best that could be done for the 20 watt satellite would be about 24° F.

This added internal heat could be provided, in a satellite not equipped with a thermoelectric generator, by the decay of about 100 grams of a suitable radioactive material.

The utilization of this heat would permit deletion of much of the insulating material now employed and would require provision of exterior panels of adequate thermal conductivity, such as the panels 7a in FIG. 1.

A modified embodiment of the invention contemplates the use of such an internal heat source to supplement that provided by internal waste heat from electronic equipment, in satellites utilizing conventional power supplies. A suitable heat producing capsule is shown at 17. A number of these capsules 17 may conveniently be positioned on the plate 13 or elsewhere on the frame to assure uniformity of temperature within the satellite. The capsule 17 is shown in section in FIG. 3 and includes a cylinder 18 formed of a high density, high melting point material, such as tantalum, in which a radioactive heat producing material 18a is contained. A suitable radioactive material will provide a radiation level at the surface of the capsule which is within human tolerances for extended exposure and will be harmless to satellite equipment for indefinite exposure. The radioactive isotope $Pu^{238}$ has been successfully employed because of its availability, its half-life (90 years, equivalent to 3.7% reduction in 5 years which is a reasonable equipment life goal), and the fact that it is an alpha emitter, so that shielding is easily accomplished.

Two plugs 19 and 20, preferably made of the same material as the cylinder 18, seal the ends of the cylinder and may be press-fitted and welded into place. The cylinder 18 and plugs 19 and 20 absorb the alpha radiation to produce heat. A second cylinder 21 is composed of a material selected primarily for protection against impact and abrasion as well as for protection against fire and the action of rocket propellant acid in the event of a launching accident. Materials selected for the cylinder 21 must be suitable for welding and heat treatment if required, at a temperature not harmful to the tantalum welds and must have a coefficient of expansion greater than tantalum. Suitable materials for the cylinder 21 are nickel-chromium alloys, stainless steels, and cobalt base alloys. The cylinder 21 is sealed at its ends with plugs 22 and 23, made of the same material as the cylinder, press-fitted into the cylinder, and welded into place. The cylinder 21 is provided with a flange 24 for mounting the capsule 17 upon the frame section.

Obviously, many modifications and variations of the present invention are possible in the light of the above teachings. It is therefore to be understood that within the scope of the appended claims the invention may be practiced otherwise than as specifically described.

What is claimed is:
1. A temperature stabilized satellite including:
   a metallic frame,
   a thermoelectric generator having heat radiating means thereon, and
   means connecting the frame to the thermoelectric generator,
   said means transferring a predetermined amount of waste heat produced by the generator to said frame for heating the interior of the satellite.
2. The temperature stabilized satellite of claim 1, in which said transferring means is a shim positioned between said thermoelectric generator and said frame, said shim being of such area and conductivity as to pass heat at a predetermined temperature.

References Cited by the Examiner

UNITED STATES PATENTS

| 2,512,875 | 6/1950 | Reynolds | 165—136 X |
| 2,521,091 | 9/1950 | Pophal | 165—46 X |
| 3,160,568 | 12/1964 | MacFarlane | 244—1 X |

OTHER REFERENCES

Aviation Week and Space Technology, pp. 52–55, 57, 59, 62, 65 and 66.

FERGUS S. MIDDLETON, *Primary Examiner.*